United States Patent [19]
Firth et al.

[11] Patent Number: 5,164,848
[45] Date of Patent: Nov. 17, 1992

[54] HELMET MOUNTED DISPLAY

[75] Inventors: Kenneth Firth, Danbury; Roger M. Langdon, Colchester, both of United Kingdom

[73] Assignee: GEC Marconi Limited, Stanmore, England

[21] Appl. No.: 603,930

[22] Filed: Oct. 26, 1990

[30] Foreign Application Priority Data

Nov. 3, 1989 [GB] United Kingdom ............ 8924831

[51] Int. Cl.$^5$ ............................................. G02B 5/32
[52] U.S. Cl. ...................................... 359/13; 359/14; 359/24; 359/34; 359/630
[58] Field of Search ............... 350/3.7, 3.72, 3.81, 350/174; 359/13, 14, 24, 34, 630, 631

[56] References Cited

U.S. PATENT DOCUMENTS

| | | | |
|---|---|---|---|
| 3,711,177 | 1/1973 | Ward | 350/3.81 |
| 3,754,814 | 8/1973 | Leith | 350/3.81 |
| 4,349,815 | 9/1982 | Spooner . | |
| 4,361,384 | 11/1982 | Bosserman . | |
| 4,372,639 | 2/1983 | Johnson | 359/13 |
| 4,398,799 | 8/1983 | Swift | 350/174 |
| 4,468,101 | 8/1984 | Ellis | 350/174 |
| 4,799,765 | 1/1989 | Ferrer | 350/174 |
| 4,874,214 | 10/1989 | Cheysson et al. | 350/174 |

FOREIGN PATENT DOCUMENTS

| | | |
|---|---|---|
| 2582414 | 11/1986 | France . |
| 1423947 | 2/1976 | United Kingdom . |
| 2123247 | 1/1984 | United Kingdom . |

OTHER PUBLICATIONS

Patent Abstracts of Japan (JP 63-187,215), vol. 12, No. 468 (p-797) (3315), Dec. 8, 1988.
Patent Abstracts of Japan (JP 59-126,503), vol. 8, No. 254 (p-315) (1691), Nov. 21, 1984.

*Primary Examiner*—Bruce Y. Arnold
*Assistant Examiner*—Martin Lerner
*Attorney, Agent, or Firm*—Spencer, Frank & Schneider

[57] ABSTRACT

A holographic objective system (3) produces an intermediate real image (4) of information displayed on an electrically addressable spatial light modulator or SLM (1), the real image (4) being collimated by a powered holographic reflector (5) constructed as part of the visor of a helmet worn by the viewer (9). The SLM (1) is illuminated by laser light from a remote laser (8) via a single optical fibre (6) and beam splitter (2). A diffuser (7) is provided either between the laser and the beam splitter or in the plane of the intermediate image (4). The objective system (3) may alternatively include, or consist entirely of, conventional optical elements.

19 Claims, 2 Drawing Sheets

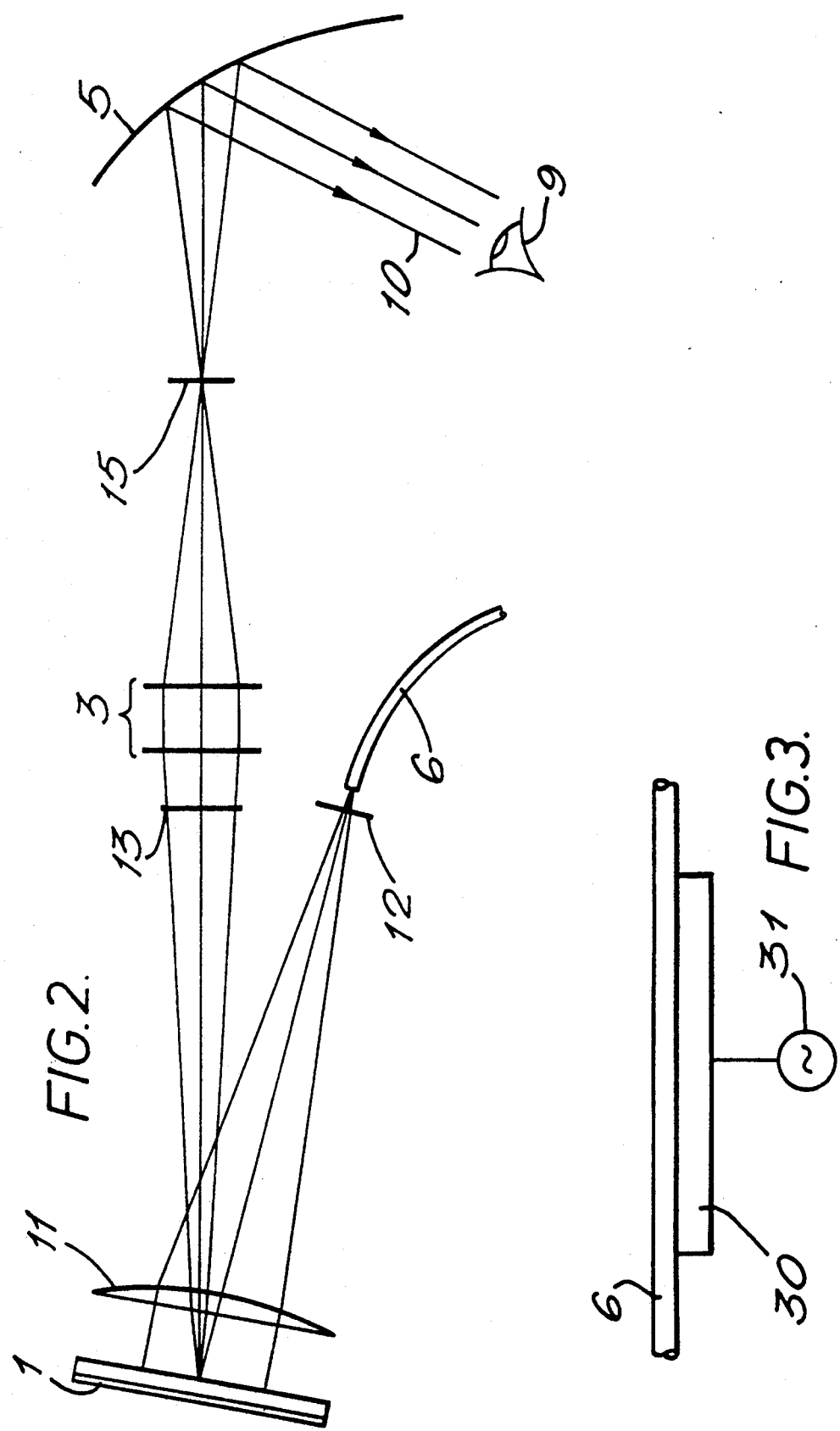

HELMET MOUNTED DISPLAY

The invention relates to helmet mounted displays.

BACKGROUND OF THE INVENTION

Helmet mounted displays consist of a display which is attached to a helmet, so as to be visible to a person e.g. a pilot, wearing the helmet. Current helmet displays generally rely on high resolution CRTS (cathode ray tubes), the images on the CRT screen being imaged by conventional optical elements and eyepieces, and as a consequence are bulky and heavy.

It is known to mount the CRT remote from the helmet and conduct an image of the CRT screen to the helmet via a light path comprising a bundle of optical fibres, the helmet incorporating conventional optics to produce an image which the user can see. However, the bundle of optical fibres required to implement this is relatively bulky and expensive. It is also known to replace conventional optics with holographic elements, thereby reducing weight and bulk: however, such holographic elements suffer unacceptable degrees of optical dispersion when used in conjunction with CRTs.

It is known from UK patent 1423947 to provide a head-up display for an aircraft in which the windscreen of the aircraft comprises a holographic reflector. The pilot views a liquid crystal display via this holographic reflector and a relay lens. This prior art is bulky and is unsuitable for mounting directly on a helmet.

It is known from U.S. Pat. No. 4,361,384 to provide a helmet-mounted display arrangement in which an image is viewed via an optical path which includes reflection by a holographic reflector disposed on the visor of a helmet worn by the viewer. In this prior art the image is produced by means of a relatively low-power flat panel display and an image intensifier.

The present invention provides a display assembly suitable for mounting on a helmet in which the display assembly is formed by a spacial light modulator capable of being illuminated by a source of laser light, an optical system comprising at least one holographic element for forming an image of the said display, and an optical path between the spatial light modulator and the source of laser light, the optical path comprising a single optical fibre.

The use of a spatial light modulator illuminated by a laser as the display enables holographic elements to be used in the optical system.

The image producing system may include a holographic collimator. The spatial light modulator may comprise an electrically addressable spatial light modulator. The spatial light modulator may be illuminated by laser light. The optical fibre may be provided with a mode scrambler.

BRIEF DESCRIPTION OF THE DRAWINGS

Further aspects of the invention will now be described by way of example with reference to the drawings in which:

FIG. 2 shows a second embodiment of a helmet-mounted display assembly in accordance with the invention; and FIG. 3 shows a mode scrambler for use with the embodiments of FIGS. 1 and 2 in accordance with the invention.

DESCRIPTION OF THE PREFERRED EMBODIMENTS

Figure 1:
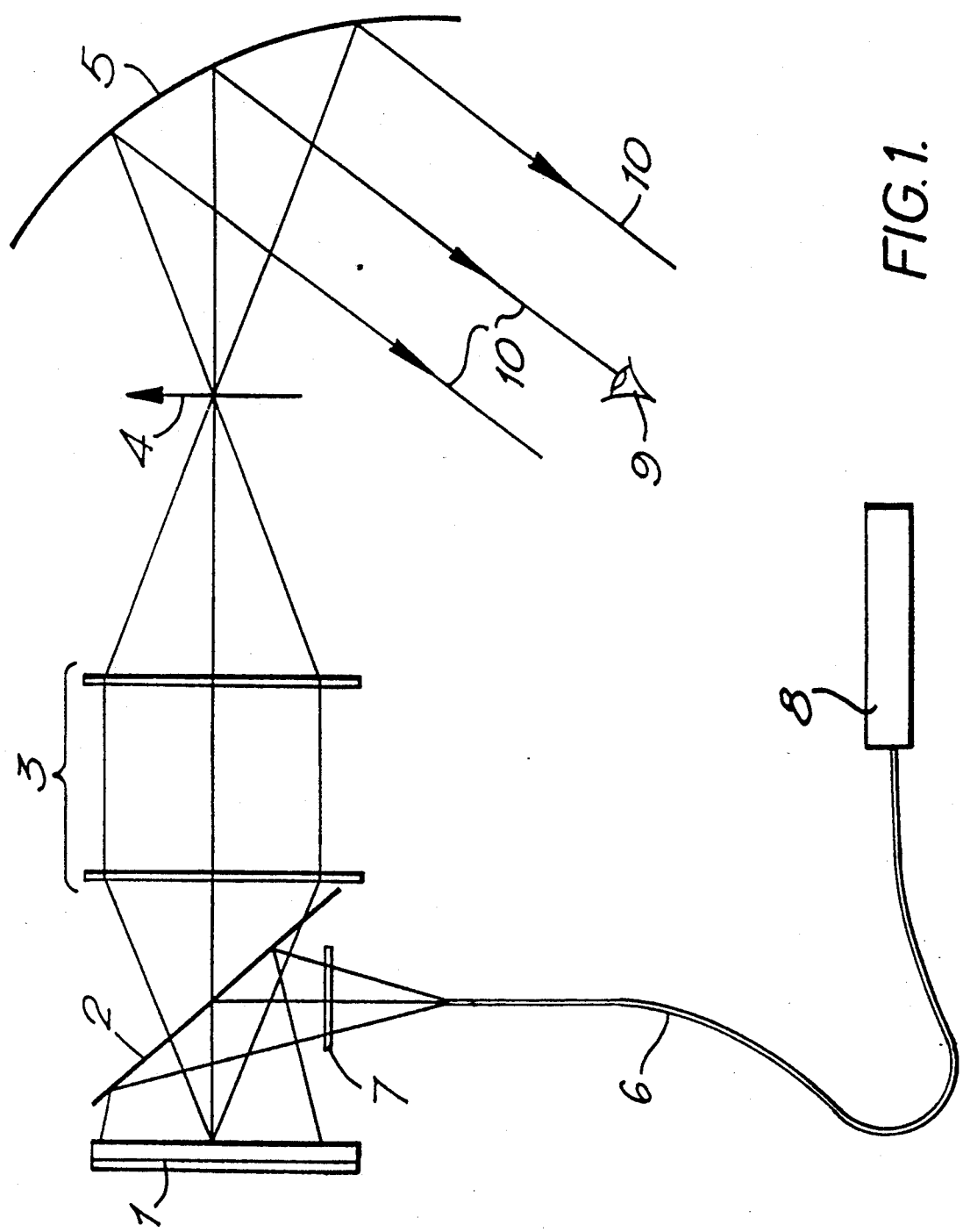
FIG. 1 shows a first embodiment of a helmet-mounted display assembly in accordance with the invention.

As shown in FIG. 1, the display has an electrically-addressable spatial light modulator (EASLM) 1 on which the display to be viewed is generated. The light modulator 1 is illuminated by monochromatic light from a laser 8. The laser 8 may be a helium neon laser or any other suitable laser e.g. a laser diode pumped Nd:YAG laser incorporating second harmonic generation.

The laser 8 is preferably not mounted on the helmet; instead, light is transmitted from the laser to the helmet via a single optical fibre 6. Light emerging from the end of the optical fibre is passed through a diffuser 7 located in the optical path as close as possible to the EASLM, and illuminates the EASLM 1 via a polarising beam splitter 2. An objective system 3 comprising one or more transmission holograms produces an intermediate image 4 of the display 1 produced by the EASLM 1. This intermediate image 4 is produced at the focal plane of a collimating combiner 5 which produces an image of the display at infinity. In an alternative arrangement, the diffuser may be mounted in the plane of the intermediate image 4.

The collimating combiner 5 consists of a reflection hologram comprising a holographic coating on the visor of the helmet. The hologram elements may comprise elements having complex powers so as to minimise the number of elements required for a given optical performance. The power of the collimating combiner 5 may be such as to compensate for optical aberrations. The balance between the powers of the transmission holograms of the objective system, 3 and the holographic combiner 5, and the use of hologram elements having complex powers, are such as to provide a well-corrected optical performance whilst minimising the number of elements in the optical path, thereby obtaining a lightweight arrangement of relatively simple construction.

A second embodiment of the invention will now be described with reference to FIG. 2.

In FIG. 2, light from a laser, not shown, emerges from a fibre optic light guide 6, passes through a polariser 12, passes through a positive lens 11 disposed in front of the EASLM 1, and falls on the EASLM 1. The SLM 1 is oriented such that light reflected from the EASLM 1 now passes back through the lens 11, through polariser 13 and into the objective system 3. The objective system 3 produces a real image of the EASLM in the plane of a diffuser 15. The image so produced is reflected by the holographic reflector or collimating combiner 5 into the eye 9 of the viewer.

The diffuser spreads the exit beam and allows a certain amount of latitude in the positioning of the eye of the viewer relative to the collimated output beam 10.

The arrangement of FIG. 2 eliminates the relatively bulky polarising beam splitter of FIG. 1 and, due to the focussing effect of the lens 11, allows the objective system 3 to have an aperture which is much smaller than the corresponding objective system 3 of FIG. 1. This allows the end of the light guide 6 and the objective system 3 to be disposed adjacent each other.

FIG. 3 shows a mode scrambler for use with any of the embodiments of the invention described above.

Coherent light from a laser produces a grainy or specular effect in the final image. This effect can be eliminated by providing a mode scrambler at some point along the optical fibre 6. An example of a suitable mode scrambler is shown in FIG. 3 in which a piezo-electric element 30 is attached to the fibre optic cable 6. The piezo-electric element 30 is driven by an alternating signal source 31 and the resulting vibrations set up in the cable cause mode scrambling of the light passing along the cable.

The spatial light modulator preferably comprises an electrically-addressed spatial light modulator comprising a silicon chip having an array of transistors whose metal contact areas function as specular reflectors with selectively adjustable polarisation angles. If the polarisation angle of the reflector corresponds with that of the incident light, then substantially all the incident light is reflected; if not, then light is reflected to a greater or lesser extent according to the degree of discrepancy between the respective angles of polarisation of the light and the reflectors. Such a light modulator is particularly advantageous in that it allows a physically compact, high resolution display to be realised.

The invention is not restricted to the arrangements shown in the embodiments and a number of modifications may be made within the scope of the invention.

For example, the invention may also be performed using alternative spatial light modulators such as transflective or transmissive liquid crystal displays. In the case of a transmissive display the polarising beam splitter 2 of FIG. 1 would of course not be required as illumination would be from the side of the display remote from the objective system 3.

Additionally, while the objective system 3 has been described as comprising holographic elements, it may alternatively include or consist entirely of conventional optical elements. This is especially so in the embodiment of FIG. 2, where the small aperture requirements allow a small and relatively light conventional lens to be employed.

The diffuser may be of any convenient type, for example a conventional diffuser e.g. ground glass, a holographic diffuser, or a Dammann grating. The latter is especially advantageous as it is highly efficient and produces an accurately controlled predetermined amount of spreading.

The holographic collimating combiner need not be located on the visor of the helmet, but may be disposed on some other transparent surface attached to the helmet in the wearer's field of view.

What is claimed is:

1. A display assembly suitable for mounting on a helmet, comprising:
   spatial light modulator means for forming a display;
   a source of laser light;
   optical path means for providing an optical path between the source of laser light and the spatial light modulator means so that the laser light illuminates the spatial light modulator means, the optical path means including a single optical fiber along which the laser light for illuminating the spatial light modulator means is conveyed;
   optical system means for forming an image of the display superposed on the field of view of the wearer of the helmet, the optical system means including
      an objective system to produce an intermediate image of the display, the intermediate image lying in a plane,
      means, including a holographic collimating and combining element, for producing said image of the display from the intermediate image, and
      a diffuser located in the plane of the intermediate image; and
   a polarising beam splitter interposed between the spatial light modulator means and the optical system means.

2. A display assembly as claimed in claim 1, wherein the optical path means further comprises another diffuser which is interposed between the source of laser light and the spatial light modulator means.

3. A display assembly as claimed in claim 1, wherein the diffuser comprises a holographic diffuser.

4. A display assembly as claimed in claim 1, wherein the diffuser comprises a Dammann grating.

5. A display assembly suitable for mounting on a helmet, comprising:
   spatial light modulator means for forming a display, the spatial light modulator means reflecting light;
   a source of laser light;
   optical path means for providing an optical path between the source of laser light and the spatial light modulator means so that the laser light illuminates the spatial light modulator means, the optical path means including a single optical fiber along which the laser light for illuminating the spatial light modulator means is conveyed; and
   optical system means for forming an image of the display superposed on the field of view of the wearer of the helmet, the optical system means including
      an objective system to produce an intermediate image of the display, the intermediate image lying in a plane,
      means, including a holographic collimating and combining element, for producing said image of the display from the intermediate image,
      a diffuser located in the plane of the intermediate image, and
      an objective lens which is disposed adjacent the spatial light modulator means, the objective lens being traversed by both the optical path and by modulated light reflected by the spatial light modulator means.

6. A display assembly as claimed in claim 5, further comprising a first polariser which is traversed by the reflected light, and wherein the optical path means further comprises a second polariser.

7. A display assembly suitable for mounting on a helmet, comprising:
   spatial light modulator means for forming a display;
   a source of laser light;
   optical path means for providing an optical path between the source of laser light and the spatial light modulator means so that the laser light illuminates the spatial light modulator means, the optical path means including a single optical fiber along which the laser light for illuminating the spatial light modulator means is conveyed and a mode scrambler connected to the single optical fiber; and
   optical system means for forming an image of the display superposed on the field of view of the wearer of the helmet, the optical system means including an objective system to produce an intermediate image of the display, the intermediate image lying in a plane, means, including a holographic collimating and combining element, for producing said image of the display from the intermediate image, and a diffuser located in the plane of the intermediate image.

8. A display assembly suitable for mounting on a helmet, comprising:

spatial light modulator means for forming a display;

a source of laser light;

optical path means for providing an optical path between the source of laser light and the spatial light modulator means so that the laser light illuminates the spatial light modulator means, the optical path means including a single optical fiber along which the laser light for illuminating the spatial light modulator means is conveyed; and optical system means for forming an image of the display superposed on the field of view of the wearer of the helmet, the optical system means including an objective system to produce an intermediate image of the display, the intermediate image lying in a plane, means, including a holographic collimating and combining element, for producing said image of the display from the intermediate image, and a diffuser located in the plane of the intermediate image, the diffuser comprising a Dammann grating.

9. A display assembly as claimed in claim 8, wherein the helmet has a visor, and wherein the holographic collimating and combining element is disposed on the visor.

10. A display assembly as claimed in claim 8, wherein the holographic collimating and combining element is a reflection hologram.

11. A display assembly as claimed in claim 8, wherein the spatial light modulator means comprises an electrically addressable spatial light modulator.

12. A display assembly as claimed in claim 8, wherein the source of laser light comprises a helium neon laser.

13. A display assembly as claimed in claim 8, wherein the spatial light modulator means comprises a reflective light modulator in which the angle of polarisation of light reflected therefrom is selectively adjustable.

14. A display assembly as claimed in claim 8, wherein the spatial light modulator means comprises a transmissive light modulator.

15. A display assembly, comprising:

a source of laser light;

spatial light modulator means for forming a display, the spatial light modulator means being illuminated by the laser light;

an objective system to produce an intermediate image of the display, the intermediate image lying in a plane;

means, including a holographic collimating combiner, for producing, from the intermediate image, another image that is visible to a viewer; and a diffuser located in the plane of the intermediate image, wherein the objective system comprises a plurality of transmission holograms which are disposed between the diffuser and the spatial light modulator means.

16. A display assembly as claimed in claim 15, further comprising a transparent body having a surface, the holographic collimating combiner being disposed on the surface of the transparent body.

17. A display assembly as claimed in claim 15, further comprising a single optical fiber which carries all of the laser light that illuminates the spatial light modulator means.

18. A display assembly as claimed in claim 15, wherein the spatial light modulator means is reflective, and further comprising a positive lens through which the laser light passes both before and after reflection by the spatial light modulator means.

19. A display assembly as claimed in claim 15, wherein the diffuser comprises a Dammann grating.

* * * * *